Figure 1:
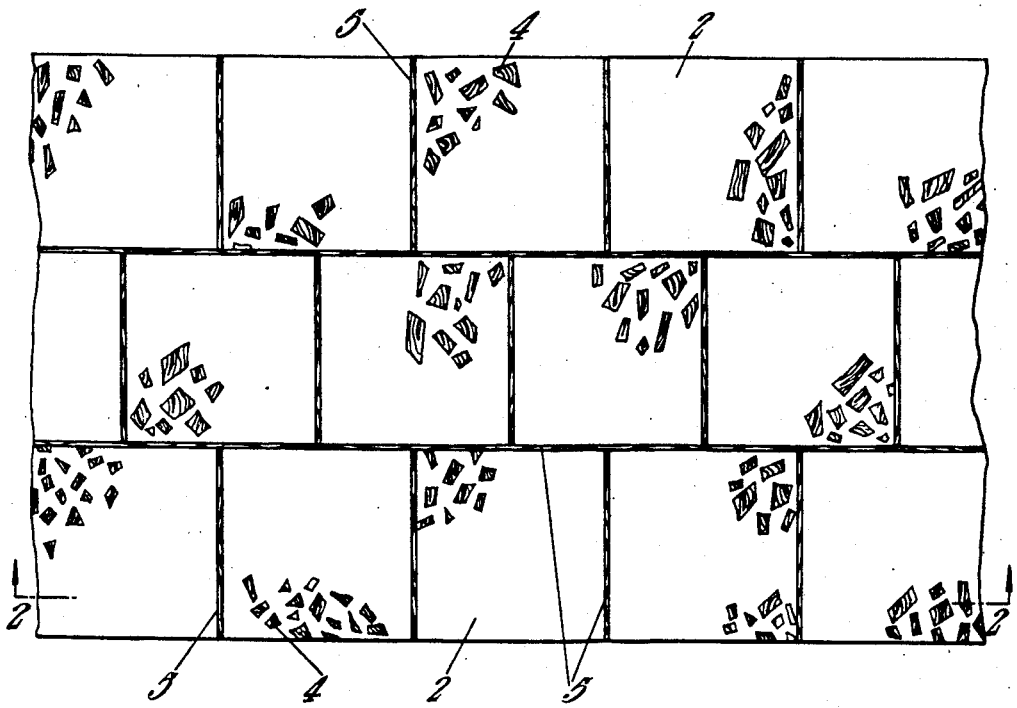

Sept. 30, 1958          A. E. COMISSO          2,854,344
FLOORING SURFACES AND THE LIKE
Filed March 26, 1953

Inventor
A. E. Comisso

20 2,854,344

FLOORING SURFACES AND THE LIKE

Adelino Emilio Comisso, Paris, France, assignor of one-half to Nigel Graeme Chittenden, Maidstone, England Application March 26, 1953, Serial No. 344,881

2 Claims. (Cl. 106—93)

This invention relates to the production of composite building surfaces or units, particularly to floor surfaces or to units, such as separately formed plates, slabs or the like, which can be employed to form such surfaces or which can be utilised to form walls, panels or the like.

A great disadvantage of the previously proposed such surfaces is their great tendency to coldness, due to the materials from which they are made and as examples of which there may be mentioned granules of marble and cement and neat pure cement. These surface forming compositions are unsuitable for certain building interiors, since in addition to their coldness they have the great disadvantage of being good sound conductors.

The present invention has for its object to provide a floor or building surface, or unit capable of forming the same, which is free from the above-mentioned disadvantages and in addition possesses other desirable properties.

A building surface in accordance with the invention, such as a floor surface or a plate, slab or the like capable of being employed to form such a surface, is formed from random oriented wood granules alone or associated with husks or other vegetable matter or waste dispersed throughout a mass of hard-setting binding agent or cement, the wood granules being 3–12 mm. thick. These granules thus form small masses of wood strongly set and maintained in the cement and in this way they do not run the risk of being detached through friction or shocks, and they moreover resist wear efficiently. The proportion of the wood granules to the cement may be of the order of 2 to 1.

According to one form of the invention, a flooring surface is formed in two layers of which the lower is composed of cork granules and cement and is laid to extend over a suitable foundation surface which may be of stone, wood, bricks and normally is not less than 1 cm. thick. The cork granules are approximately the size of a grain of rice. The cement employed can be Portland cement or calcinated magnesite cement, or it can be replaced by a thermosetting plastic material or by some kind of plaster. Before its use the cork may be treated in a bath of silicate and casein, or the cement may be treated so as to adhere to the cork.

The lower layer serves to deaden sound and to provide an insulator and has the top layer applied to its flat upper surface. The upper layer is composed of wood granules of spherical, parallelepipedal or cubic shape of 3–12 mm. size, these granules having their fibres disposed in all directions and being dispersed throughout a suitable cement. Such a layer will be found to provide an ideal surface for the interiors of offices, shops, showrooms, corridors, apartments, dining rooms, public works, hospitals, clinics, theatres, public libraries, and all public administrative buildings. As mentioned above in connection with the lower layer, the wood granules may also be treated in a silicate bath thereby petrifying or hardening the granules. In addition, the bath treatment also imparts an insoluble coating to the granules in so far as moisture is concerned. Lastly, I have ascertained that the silicate bath tends to render the granules fireproof which is also desirable.

The upper layer, which forms the floor surface itself, adheres to the lower layer to form a homogeneous dense surface which is hygienic and possesses a resistance capable of withstanding the most intense wear, such resistance being mainly due to the presence of the wood granules, the fibres of which extend in all directions throughout the floor surface and within the cement layer containing the same.

Moreover, the proportion of granules of wood in the cement being very high, these granules are very close to one another and frequently touch each other, thus forming a practically continuous wood surface which has the consistency of natural wood.

The incorporation of the granulated wood into the cement not only annuls all reaction of the cement, and thus prevents any cracking of the cement which might otherwise occur, but the wood granules being firmly embedded and imprisoned in a cement of strong adherence, are prevented from contracting or expanding.

The upper layer, composed of wood granules dispersed through a cement, such as Portland or magnesium cement, plastic material or synthetic resin, should be applied to the bottom layer to a thickness of about 1 cm. and before their incorporation in the cement mass.

The provision of the lower cork layer may be omitted, the wood cement mixture being in such case applied directly to the structural material, for instance, cement, concrete, stone or brick, forming the floor.

The invention renders it possible to utilise wood waste and by its dispersal in the form of small granules throughout a cement mass while in a plastic state, a mortar-like mass results which can be applied on any flat or even irregular or curved surface.

The surface of the floor, however, can also be subdivided by vertically placed wooden strips, which may be polished to present the appearance of decorative joints, which also serve as expansion joints.

The invention may be also applied in the production of sheets, plates or slabs which are capable of being employed to form floors, walls or like building surfaces or which might be otherwise employed and which are composed of a suitable cement having wood granules dispersed throughout the same.

The present method offers a very beautiful decorative effect, whilst being economical at the same time.

This method may be applied directly even on supports consisting of reinforced cement without it being able to react in any way, this advantage being due to the fact that the granulation of wood, by its position in the mass, radically stops any reaction which might occur in the cement.

Figure 2:
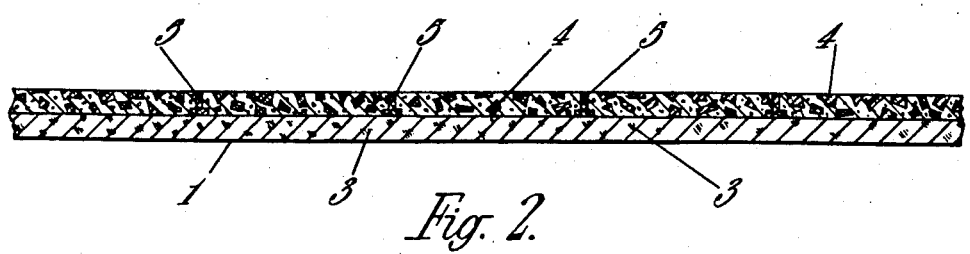

In the accompanying drawing:

Figures 1 and 2 are plan and sectional end views of a portion of flooring constructed in accordance with the preferred method.

In the arrangement shown, the flooring consists of two layers as hereinbefore described, the lower layer 1 being composed of cork granules 3 and the cement and the upper layer 2 being composed of wood granules 4 dispersed throughout a suitable cement. Before the upper layer is laid, however, strips of wood 5 are fixed on the insulating under layer 1 and act as expansion joints and since the upper edges of these strips appear on the surface of the upper layer 2 they also act as decorative joints.

These strips are in the form of an inverted T, and their heel (foot) that is to say their base (represented as the bar of the T) is fixed with nails or with glue which is insoluble in water on to the cork under-layer. These strips give the exact thickness for the application of the compound and allow the workman to compress the mass with a small ruler, the ends of which vibrate on the surface of the two strips, which allows the mass between these two strips to be levelled.

With these strips various geometrical figures can be represented—squares or triangles, diamonds, curved lines, etc. Furthermore, in special cases it is possible with these strips to make all the designs which the architects may require, and in this case, in order to bend the strips according to the shape of the desired form, the bar of the T must be suppressed and the strips must then be fixed with small forks, which will be removed as soon as the compound of the surface is applied. The strips thus remain embedded in the mass.

The strips having been fixed, we pass on to the application of the surface proper of the method which is the subject of this patent.

For manufacturing the granulated wood, waste, which could not be otherwise used, is recovered from various wood industries, and this waste is passed into a grinder provided with special hammers, and is subsequently passed through automatic screens for obtaining the granulation with the required dimensions.

This granulated wood is then immersed in a solution of potassium silicate of a density of 10° Bé. After this treatment this granulation is allowed to dry during a minimum period of 3 to 4 days. This treatment renders the wood incombustible and also petrifies it.

Different kinds of cement or binding agents may be used in this method. A binding agent of plastic material such as chlorite (urea formol) may for example be used. However, the use of this binding agent gives rise to disadvantages for application to the flooring in situ, since in point of fact, for the hardening of this material, a temperature above 30° C. is required. On the other hand a binding agent of this kind gives good results from the point of view of insolubility in water and perfect adhesion to wood, whilst being at the same time incombustible. It is therefore possible to make prefabricated plates or slabs for example with this binding agent, but it has no stability against the buckling reaction of plates. In any case, when a binding agent of this kind is used it is employed in the proportion of 30% of the volume of the wood.

Another binding agent which I also use is the cement of calcined magnesia composed in the following manner: 10 volumes of cement of calcined magnesia, 4 volumes of very fine powdered asbestos (this for increasing the resistance to the action of heat), 2 volumes of chalk (this for absorbing the moisture produced by the magnesium chloride), 1 volume of Venetian talc (for facilitating the adhesion of the binding agent to the wood).

The binding agent thus composed is moistened with liquefied magnesium chloride, which is indispensable for the hardening of the cement, but it is known that this magnesium chloride attacks metals, sometimes causing grave concern, since it can attack metals such as water pipes, conductors of electricity, gas pipes, etc., which are superposed on the reinforced cement and are embedded subsequently by the lower under-layer of my method, which under-layer is composed of cork in addition to this binding agent. However, this disadvantage may also be overcome by preparing a special under-layer formed of the following compound: sand—4 volumes; cork—3 volumes; cement—2 volumes. This composition must be simply moistened with water and in view of the fact that it does not contain any magnesium chloride, it does not have the disadvantage of attacking metals as mentioned above.

However, the most suitable and economical binding agent which I use is that on a basis of Portland cement. Of course, all building technicians know that the contrast between Portland cement and wood is so great that there is no possibility of adhesion between the two, and it was absolutely necessary to find a means of treating the cement in advance for rendering it adhesive to wood and making it completely stable. I was therefore forced to study this problem for a long time, and finally succeeded in settling this formula and, in spite of the fact that the use of casein and cement is already known, I do not think that I am wrong in declaring that my method as a whole constitutes an absolutely new discovery.

This Portland cement which forms the binding agent must be treated with a composition which I refer to as stearate composed of the following ingredients: calcium oxide, Filler St. Martin (a natural dolomite, namely a mixture of calcium carbonate and magnesium carbonate), magnesium oxide, in the proportions of 60%, 20% and 20% respectively, these ingredients being mixed and ground together and then treated in a gyratory tube having a continuous rotary movement, heated externally, for example by gas, this operation being intended to eliminate any moisture which the mineral powders might contain. This composition of stearate obtained in this manner is added to Portland cement in the proportion of approximately 3% of the specific weight. When the stearate has been well mixed with the Portland cement the mixture thus obtained is added to the granulated wood on the basis of 2 volumes of granulated wood to 1 volume of cement.

After this mixture has been thoroughly mixed it is moistened with calcium chloride. This calcium chloride is indispensable in the formation of the flooring since it plays a considerable role in the adhesion and hardness of the cement. Whilst adding this chloride to the mixture, continue to stir until the granulated wood is completely surrounded by cement, thus forming a perfectly homogenous compound.

It is also possible to add to this formula of Portland cement a certain percentage of latex (about 10%) which, becoming vulcanised throughous the cement, gives more suppleness to the mass.

Once this compound is ready the workman proceeds to apply it by spreading the mass with the help of a trowel and then vibrating it with a mechanical vibrating ruler, this operation aiding the packing and interlacing of the fibre of the granulated wood. When the application has been finished some moments are allowed to elapse for the cement to become consistent, and when the cement has become consistent the completion of the smoothing over is proceeded with mechanically with the help of a machine having as its principle friction by means of a rotary disc consisting of rustless steel, this operation giving a straight surface, at the level of the strips previously placed in position. Furthermore, this pressure suppresses any porosity which might occur in the mass.

A few days after this operation we start with the pouncing or pumicing. This pouncing must also be effected mechanically with the help of a machine consisting of a rolling cylinder provided with abrasive paper, the rotation of the cylinder with the help of an electric motor being produced at a rhythm of 1,400 revolutions per minute, and this cylinder, in contact with the flooring, produces a friction which allows the superfluous films of cement to be removed from the surface, thus giving a continuous surface, on which the structure of the wood granules clearly appears.

This surface comprises a very high percentage of wood, almost similar to a normal integral wood floor, and forming, with the anterior layer of cork, a homogeneous floor having very good qualities of thermal and acoustic insulation, as well as permitting the counteracting of internal tensions which might be produced in the newly constructed building.

The preservation treatment of this surface may be effected with wax, or with a protective plastic varnish.

The present method is completely stable, of great resistance to wear, and non-skidding, which is due to the fact that the interlacing of the fibers of the granulated wood and the strong adhesion of the binding agent to the wood does not permit a single particle of wood to become detached from the floor. For this reason, right until the very last limit of wear, this surface will always remain of the same appearance.

It is worth drawing attention to the fact that with this method, thanks to the strips placed on the cork support and acting as expansion joints, in case internal tensions may be produced in a newly constructed building, if these tensions have a movement of normal strength the reaction of this tension would be absorbed by the underlayer of cork and consequently the surface would not suffer any disadvantage (such as cracking) from this movement. If however this internal tension should be more violent than the normal one, the cracks which might be produced on the surface would follow the expansion joints, and after the action of the internal tension had passed, these cracks could very easily be cemented with the same binding agent used for the composition without leaving any trace of a repair having been effected.

This method also has the advantage that it can be put into effect in the form of plates or prefabricated tiles. In this case each of the plates must be made in the same way as the continuous flooring, in two layers, the lower layer being an insulating layer and the upper layer having a basis of granulated wood and binding agent.

For these plates the lower layer may consist of various other materials, if there is question of economy, such, for example, as pumice stone or sawdust from fibrous wood.

These plates may be made by hand or mechanically with the help of a machine for the required dimensions.

I claim:

1. A decorative wear resistant floor surface having the soft and supple characteristics of wood comprising at least one layer composed of hard wood granules of spherical, parallelepipedal or cubic shape and of 3 to 12 mm. size subjected to a silicate solution and dried to petrify, waterproof and fireproof such granules embedded in a hydraulic cement mass of Portland cement mixed with calcium oxide, Filler St. Martin and magnesium oxide in the proportions of 60%, 20% and 20% respectively to promote adhesion between the wood granules and the cement, the granules being intimately mixed with the cement mass in the proportion of 1 volume of cement mass to 2 volumes of wood granules with the fibers of the granules extending in all directions throughout the mass whereby the crossing fibers define a medium highly resistant to wear and possessing a high degree of insulation against a cold supporting surface.

2. A decorative wear resistant floor surface having the soft and supple characteristics of wood comprising at least one layer composed of hardened, waterproofed and fireproofed wood granules of spherical, parallelepipedal or cubic shape and of 3 to 12 mm. size embedded in a hydraulic cement mass mixed with approximately 3% alkaline earth oxides and carbonates to promote adhesion between the wood granules and the cement, the wood granules being intimately mixed with the cement mass so that the fibers of the granules extend in all directions throughout the cement mass so that the crossing fibers provide a surface highly resistant to wear and possess a high degree of insulation against a cold supporting surface, the ratio of wood granules to cement mass being of the order of 2 to 1.

References Cited in the file of this patent

UNITED STATES PATENTS

| | | |
|---|---|---|
| 898,381 | Mattison | Sept. 8, 1908 |
| 1,590,649 | Schack | June 29, 1926 |
| 1,864,287 | Welch | June 21, 1932 |
| 1,893,742 | Heidman | Jan. 10, 1933 |
| 1,991,877 | Zottoli | Feb. 19, 1935 |
| 2,057,330 | Eichert | Oct. 13, 1936 |